(12) United States Patent
Oonishi et al.

(10) Patent No.: US 7,998,520 B2
(45) Date of Patent: Aug. 16, 2011

(54) FAT-AND-OIL COMPOSITION, AND OIL-IN-WATER EMULSIFIED PRODUCT CONTAINING THE FAT-AND-OIL COMPOSITION

(75) Inventors: Kiyomi Oonishi, Kanagawa (JP); Yoshiyuki Hatano, Kanagawa (JP); Hirofumi Haruna, Kanagawa (JP); Yuka Kikuchi, Kanagawa (JP); Akira Sato, Kanagawa (JP); Hiroki Kannari, Kanagawa (JP); Masayuki Sato, Kanagawa (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 0 days.

(21) Appl. No.: 12/911,118

(22) Filed: Oct. 25, 2010

(65) Prior Publication Data

US 2011/0039008 A1   Feb. 17, 2011

Related U.S. Application Data

(63) Continuation-in-part of application No. PCT/JP2009/051419, filed on Jan. 29, 2009.

(30) Foreign Application Priority Data

Apr. 24, 2008 (JP) ................................. 2008-114167
Sep. 19, 2008 (JP) ................................. 2008-241224

(51) Int. Cl.
*A23C 13/00* (2006.01)

(52) U.S. Cl. ........ 426/585; 426/580; 426/586; 426/601; 426/613

(58) Field of Classification Search .............. 426/580, 426/585, 586, 601, 606, 607, 613
See application file for complete search history.

(56) References Cited

U.S. PATENT DOCUMENTS

| | | | |
|---|---|---|---|
| 4,533,561 A * | 8/1985 | Ward | 426/603 |
| 4,610,889 A * | 9/1986 | Schmidt | 426/602 |
| 4,716,047 A * | 12/1987 | Biernoth et al. | 426/603 |
| 6,156,370 A * | 12/2000 | Huizinga et al. | 426/607 |
| 6,210,739 B1 * | 4/2001 | Nalur | 426/607 |
| 6,497,914 B1 | 12/2002 | Hidaka et al. | |
| 6,808,737 B2 * | 10/2004 | Ullanoormadam | 426/603 |

FOREIGN PATENT DOCUMENTS

| | | |
|---|---|---|
| JP | 63-014675 | 1/1988 |
| JP | 05-030911 | 2/1993 |
| JP | 05-219887 | 8/1993 |
| JP | 06-141808 | 5/1994 |
| JP | 07-194330 | 8/1995 |
| JP | 10-075729 | 3/1998 |
| JP | 10-155448 | 6/1998 |
| JP | 2000-041609 | 2/2000 |
| JP | 2000-041609 A | 2/2000 |
| JP | 2002-034450 | 2/2002 |
| JP | 2003-325104 | 11/2003 |
| JP | 2008-086268 | 4/2008 |

OTHER PUBLICATIONS

International Search Report for PCT/JP2009/051419, mailed Apr. 28, 2009.
Executed declaration of Shozo Sakaguchi (translator) dated Oct. 28, 2010 with English translations of Tables in JP 05-219887A (pp. 3/6, 4/6 upper, 4/6 middle, 4/6 last, 5/6 upper, 5/6 middle, 5/6 last), JP 06-141808A (Table 1, Table 2), JP2000-041609A (Table 1, Table 2, Table 3) and JP 07-194330A (Table 1).
International Search Report for PCT/JP2009/051420, mailed Apr. 28, 2009.

* cited by examiner

*Primary Examiner* — Leslie Wong
(74) *Attorney, Agent, or Firm* — Nixon & Vanderhye P.C.

(57) ABSTRACT

A fat-and-oil composition comprising fats-and-oils A and B, and C and/or E, all being derived from vegetable fats-and-oils, the composition satisfying conditions (a), (b) and (c):

A: at least one of lauric fats-and-oils, and fractionated, extremely hardened or transesterified oils of lauric fats-and-oils,
B: a liquid oil,
C: a transesterified oil of D derived from vegetable fats-and-oils,
D: a fat-and-oil wherein the contents of saturated fatty acids and unsaturated fatty acids having 16 or more carbon atoms in all the constitutive fatty acids being 20%≦ but <75% by mass, and 25%≦ but <70% by mass, respectively, and
E: a middle-melting fractionated oil of palm oil and/or palm oil wherein the solid fat content is 50≦ but <100% at 10° C., 20≦ but <90% at 20° C., and <6% at 35° C.,
the contents of A, B, and C and/or E in all the fat-and-oil ingredients derived from vegetable fats-and-oils being (a) 60%< but ≦98% by mass, (b) 1 to 25% by mass, and (c) 1 to 38% by mass.

10 Claims, No Drawings

FAT-AND-OIL COMPOSITION, AND OIL-IN-WATER EMULSIFIED PRODUCT CONTAINING THE FAT-AND-OIL COMPOSITION

This application is the Continuation-in-Part of International Application No. PCT/JP2009/051419 filed 29 Jan. 2009, which designated the U.S. and claims priority to Japan Application No. 2008-114167 filed 24 Apr. 2008; and Japan Application No. 2008-241224 filed 19 Sep. 2008, the entire contents of each of which are hereby incorporated by reference.

TECHNICAL FIELD

This invention relates to a fat-and-oil composition which can suitably be used for preparation of an oil-in-water emulsified product which is mainly used as a cream, particularly whipping cream in the confectionery and bread-making fields.

This invention also relates, among oil-in-water emulsified products used as creams, particularly whipping creams mainly in the confectionery and bread-making fields, to an oil-in-water emulsified product which contains substantially no trans fatty acid, has high emulsification stability even in a high fat-and-oil content, and is good in whipping characteristics such as melting mouthfeel, foaming properties and shape-retaining properties.

BACKGROUND ART

As an oil-in-water emulsified product used as cream, particularly whipping cream used mainly in the confectionery and bread-making fields, natural fresh cream, which is manufactured by separating milk fat from raw milk, has hitherto been used. However, although fresh cream is excellent in such a degree that there is no analog in respect of flavor, in an emulsion state before whipping, sudden rise of the viscosity so-called bote or solidification is liable to occur due to rise of the temperature thereof during preservation or vibration during transportation, and there has been difficulty in the aspect of its handling. Furthermore, fresh cream has had such problems that the quality of raw milk as its raw material is liable to change depending on seasons, and it is expensive.

Therefore, as oil-in-water emulsified products which are comparatively inexpensive, easy to obtain and comparatively stable in quality, there have been developed compound-type oil-in-water emulsified products wherein part of the milk fat is replaced with a vegetable fat-and-oil, and vegetable-type oil-in-water emulsified products wherein all of the milk fat is replaced with a vegetable fat-and-oil.

As vegetable fats-and-oils used in vegetable-type oil-in-water emulsified products, there can be mentioned lauric fats-and-oils containing much lauric acid as a saturated fatty acid having 12 carbon atoms such as coconut oil and palm kernel oil; vegetable fats-and-oils containing much fatty acids having 16 or more carbon atoms such as and palm oil and rapeseed oil; hardened oils and fractionated oils of these vegetable fats-and-oils; mixed oils thereof; etc.

Oil-in-water emulsified products obtained using only a lauric fat-and-oil exhibit very good melting mouthfeel, but they have a problem that their viscosity tends to rise due to temperature change, and it is difficult to maintain a moderate foaming state and hardness suitable for work. As to oil-in-water emulsified products obtained using only a lauric fat-and-oil, their preparation becomes possible when their fat content is made to be low, but problems have yet remained that when they are used as cream, particularly whipping cream, they are brittle, and poor in shape-retaining properties, and so on as the physical properties of whipped cream after whipping.

On the other hand, since oil-in-water emulsified products obtained by using together a lauric fat-and-oil and a hardened oil of a vegetable fat-and-oil containing much fatty acids having 16 or more carbon atoms such as palm oil or rapeseed oil have good balance of melting mouthfeel, emulsification stability and shape-retaining properties, they have hitherto widely been used as cream, particularly whipping cream (e.g., see Patent Documents 1 and 2).

However, in recent years, a theory has appeared that trans fatty acids contained in hardened oils are nutritionally undesirable, fat-and-oil-containing foods of a reduced trans fatty acid content have socially come to be claimed, and, for example, in U.S.A., it is obligatory to make an indication on foods containing trans acids in an amount exceeding a certain standard. Therefore, also as to oil-in-water emulsified products used as cream, particularly whipping cream, it has come to be claimed not to use a hardened oil of a vegetable fat-and-oil containing trans fatty acids.

As an oil-in-water emulsified product substantially containing no trans fatty acid, one wherein a lauric fat-and-oil and a middle-melting fractionated oil of palm oil are used together, or the like is conceived (e.g., see Patent Document 3).

However, although an oil-in-water emulsified product obtained by using together a lauric fat-and-oil and a middle-melting fractionated oil of palm oil contains substantially no trans fatty acid, when the oil-in-water emulsified product is one having a high fat-and-oil content (i.e., one containing much fat-and-oil), it has a problem, particularly in emulsification stability, and could not be satisfactory in practical use. Thus, although an oil-in-water emulsified product of a high fat-and-oil content, i.e., containing much fat-and-oil, used in cream, particularly whipping cream, is very advantageous in the aspect of good taste, it has yet been unsatisfactory in respect of quality.

Therefore, development of an oil-in-water emulsified product containing substantially no trans fatty acid, having a high fat-and-oil content but nevertheless having high emulsification stability, and being good in whipping characteristics such as melting mouthfeel, foaming properties and shape-retaining properties has been desired.

As inventions of fat-and-oil compositions and oil-in-water emulsified products, for cream, both of which contain a lauric fat-and-oil in an amount of 60% by mass or more based on all the fat-and-oil ingredients, there are Patent Documents 4 and 5.

Patent Document 1: JP 10-075729 A
Patent Document 2: JP 2002-034450 A
Patent Document 3: JP 05-219887 A
Patent Document 4: JP 06-141808 A
Patent Document 5: JP 2000-041609 A

DISCLOSURE OF INVENTION

Problems to be Solved by the Invention

The object of this invention is to provide a fat-and-oil composition suitably usable for preparation of, among oil-in-water emulsified products which are used as cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouthfeel, foaming properties and shape-retaining properties.

The object of this invention is also to provide, among oil-in-water emulsified products which are used as a cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouthfeel, foaming properties and shape-retaining properties.

Means for Solving the Problems

The present inventors have intensely studied for solving the above problems, and as a result, they found that, by using a fat-and-oil composition comprising a lauric fat-and-oil and a liquid oil for preparation of an oil-in-water emulsified product used as a cream, particularly whipping cream, and adjusting the content of trans fatty acids, an oil-in-water emulsified product can be obtained which contains substantially no trans fatty acid, has high emulsification stability even in a high fat-and-oil content, and is good in whipping characteristics such as melting mouthfeel, foaming properties and shape-retaining properties, and completed the invention.

Namely, the invention, first, relates to a fat-and-oil composition comprising a fat-and-oil A and a fat-and-oil B as defined below and satisfying the following conditions (a) and (b):

Fat-and-oil A: At least one fat-and-oil selected from the group consisting of lauric fats-and-oils, fractionated oils of lauric fats-and-oils, extremely hardened oils of lauric fats-and-oils and transesterified oils obtained by subjecting lauric fats-and-oils to transesterification reaction, Fat-and-oil B: A liquid oil, (a) the content of fat-and-oil A in all the fat-and-oil ingredients derived from vegetable fats-and-oils being more than 60% by mass but 98% by mass or less, and (b) the content of fat-and-oil B in all the fat-and-oil ingredients derived from vegetable fats-and-oils being 1 to 25% by mass.

In the oil-in-water emulsified product of the invention containing the above fat-and-oil composition, fat-and-oil A mainly contributes to good melting mouthfeel accompanied by cool feeling, and fat-and-oil B mainly contributes to good emulsification stability.

The above fat-and-oil composition can contain a fat-and-oil C and/or a fat-and-oil E as defined below in an amount of 1 to 38% by mass as the total of fat-and-oil C and fat-and-oil E based on all the fat-and-oil ingredients containing themselves, derived from vegetable fats-and-oils:

Fat-and-oil C: a transesterified oil obtained by subjecting a fat-and-oil D as defined below to transesterification reaction, Fat-and-oil D: a fat-and-oil wherein the content of saturated fatty acids having 16 or more carbon atoms in all the constitutive fatty acids being 20% by mass or more but less than 75% by mass, and the content of unsaturated fatty acids having 16 or more carbon atoms in all the constitutive fatty acids being 25% by mass or more but less than 70% by mass, and Fat-and-oil E: a middle-melting fractionated oil of palm oil and/or palm oil in which fractionated oil and/or palm oil, the solid fat content at 10° C. is 50% or more but less than 100%, the solid fat content at 20° C. is 20% or more but less than 90%, and the solid fat content at 35° C. is less than 6%.

As a suitable example of fat-and-oil D, there can be mentioned a fractionated oil of palm oil having an iodine value of 55 to 71.

When fat-and-oil C is compounded in the fat-and-oil composition of the invention, fat-and-oil C mainly contributes to good emulsification stability in the oil-in-water emulsified product of the invention.

When fat-and-oil E is compounded in the fat-and-oil composition of the invention, fat-and-oil E mainly contributes, in the oil-in-water emulsified product of the invention, particularly cream, to good melting mouthfeel of whipped cream.

The above fat-and-oil composition can contain milk fat so that the content of the milk fat in all the fat-and-oil ingredients in the fat-and-oil composition can be 10 to 90% by mass.

When milk fat is compounded in the fat-and-oil composition of the invention, the milk fat mainly contributes, in the oil-in-water emulsified product of the invention, particularly cream, to good flavor and good melting mouthfeel of whipped cream.

The fat-and-oil composition of the invention is suitable for use in preparation of an oil-in-water emulsified product, particularly cream.

The invention also relates to an oil-in-water emulsified product which contains the above fat-and-oil composition and wherein the proportion of trans fatty acids in all the constitutive fatty acids in all the fat-and-oil ingredients in the oil-in-water emulsified product is less than 5% by mass. The oil-in-water emulsified product can contain milk fat, and in the occasion, it is preferred that, in all the fat-and-oil ingredients in the oil-in-water emulsified product, the total content of fat-and-oil ingredients derived from vegetable fats-and-oils is 10 to 90% by mass, and the content of the milk fat is 10 to 90% by mass.

The content of all the fat-and-oil ingredients in the oil-in-water emulsified product can be more than 40% by mass. The oil-in-water emulsified product is preferably cream, and particularly preferably whipping cream.

The invention also relates to a food using the above oil-in-water emulsified product.

EFFECT OF THE INVENTION

According to the invention, there can be provided a fat-and-oil composition suitably usable for preparation of, among oil-in-water emulsified products which are used as a cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouthfeel, foaming properties and shape-retaining properties.

According to the invention, there can also be provided, among oil-in-water emulsified products which are used as a cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouthfeel, foaming properties and shape-retaining properties.

BEST MODE FOR CARRYING OUT THE INVENTION

The invention is described in detail below.
First, the fat-and-oil composition of the invention is described.

The fat-and-oil composition of the invention is a fat-and-oil composition comprising a fat-and-oil A and a fat-and-oil B as defined below and satisfying the following conditions (a) and (b):

Fat-and-oil A: At least one fat-and-oil selected from the group consisting of lauric fats-and-oils, fractionated oils of lauric fat-and-oils, extremely hardened oils of lauric fat-and-oils and transesterified oils obtained by subjecting lauric fat-and-oils to transesterification reaction, Fat-and-oil B: A liquid oil, (a) the content of fat-and-oil A in all the fat-and-oil ingredients derived from vegetable fats-and-oils being more than 60% by mass but 98% by mass or less, and (b) the content of fat-and-oil B in all the fat-and-oil ingredients derived from vegetable fats-and-oils being 1 to 25% by mass.

In the invention, the fat-and-oil ingredients derived from vegetable fats-and-oils include not only vegetable fats-and-oils themselves but also fats-and-oils obtained by subjecting vegetable fats-and-oils as raw materials to processing treatments such as fractionation, hydrogenation and transesterification. Fat-and-oil A, fat-and-oil B, fat-and-oil C and fat-and-oil E used as fat-and-oil ingredients of the fat-and-oil composition as described later, and fat-and-oil D used for preparation of fat-and-oil C are fat-and-oil ingredients derived from vegetable fats-and-oils.

The total content of fat-and-oil ingredients derived from vegetable fats-and-oils, in all the fat-and-oil ingredients in the fat-and-oil composition can be 10 to 100% by mass, and is preferably 10 to 90% by mass, more preferably 30 to 90% by mass and still more preferably 50 to 90% by mass.

In the invention, the phrase "all the fat-and-oil ingredients derived from vegetable fats-and-oils" means the total of the contained fat-and-oil ingredients derived from vegetable fats-and-oils. Furthermore, in the invention, the phrase "all the fat-and-oil ingredients" means the total of the contained all of fat-and-oil ingredients.

As fat-and-oil A which is a raw material fat-and-oil of the fat-and-oil composition of the invention, there can be used at least one fat-and-oil selected from the group consisting of lauric fats-and-oils, fractionated oils of lauric fats-and-oils, extremely hardened oils of lauric fats-and-oils and transesterified oils of lauric fats-and-oils.

Laurie fats-and-oils are a general term of fat-and-oils whose constitutive fatty acids are rich in lauric acid which is a saturated fatty acid having 12 carbon atoms. For the lauric fat-and-oil to have good cool feeling peculiar to lauric fats-and-oils, it is preferred that the content of lauric acid in all the constitutive fatty acids of the fat-and-oil is 30% by mass or more. As the lauric fats-and-oils, there can be mentioned coconut oil, palm kernel oil, etc. As fat-and-oil A, there can also be used a fractionated oil of a lauric fat-and-oil obtained by fractionating a lauric fat-and-oil, an extremely hardened oil obtained by extremely hydrogenating a lauric fat-and-oil (the hardened oil does not substantially contain any trans fatty acid), and a transesterified oil obtained by subjecting a lauric fat-and-oil alone or a mixture of lauric fats and/or oils to transesterification reaction.

By compounding of fat-and-oil A, an oil-in-water emulsified product obtained by using the fat-and-oil composition of the invention, particularly whipping cream becomes good in melting mouthfeel accompanied by cool feeling.

Fat-and-oil B which is a raw material fat-and-oil of the fat-and-oil composition of the invention is a liquid oil. In the invention, the liquid oil means a vegetable fat-and-oil having fluidity at ordinary temperature (25° C.), and preferably means a vegetable fat-and-oil having fluidity at 5° C. More preferably, the liquid oil means a vegetable fat-and-oil which is, in a cooling test [Kijun Yushi Bunseki Shikenho (Standard Methods for the Analysis of Fats, Oils and Related Materials) 2.2.8.1-1996, Cooling Tests (the first one)], clear (transparent) at 0° C. for 5 hours or more. As examples of the liquid oil, there can be mentioned soybean oil, rapeseed oil, rapeseed oil having a high oleic acid content, cotton seed oil, corn oil, sunflower seed oil, safflower oil, sesame oil, rice bran oil, olive oil, peanut oil, linseed oil, etc., and processed oils of one or a mixture of these oils, for example, hydrogenated oils of one or a mixture of these oils, transesterified oils obtained by subjecting one or a mixture of these oils to transesterification, and fractionated oils of one or a mixture of these oils.

By compounding of fat-and-oil B, an oil-in-water emulsified product, particularly cream obtained by using the fat-and-oil composition of the invention becomes better in emulsification stability, and becomes easier to use because change with time lapse of shape-retaining properties and dripping of water after whipping becomes smaller.

An oil-in-water emulsified product, particularly cream obtained by using the fat-and-oil composition of the invention containing fat-and-oil A and fat-and-oil B at respectively predetermined amounts has high emulsification stability even in a high fat-and-oil content, and is good in whipping characteristics such as melting mouthfeel, foaming properties and shape-retaining properties. The fat-and-oil composition can contain as optional ingredient(s) a fat-and-oil C and/or a fat-and-oil E as defined below.

Fat-and-oil C as an optional ingredient which can be compounded in the fat-and-oil composition of the invention is an transesterified oil obtained by subjecting a fat-and-oil D as defined below to transesterification reaction. When fat-and-oil C is compounded in the fat-and-oil composition of the invention, the fat-and-oil C mainly contributes to good emulsification stability in the oil-in-water emulsified product of the invention.

Fat-and-oil D is a fat-and-oil wherein the content of saturated fatty acids having 16 or more carbon atoms in all the constitutive fatty acids is 20% by mass or more but less than 75% by mass, and the content of unsaturated fatty acids having 16 or more carbon atoms in all the constitutive fatty acids is 25% by mass or more but less than 70% by mass. The content of saturated fatty acids having 16 or more carbon atoms in all the constitutive fatty acids is preferably 25% by mass or more but less than 70% by mass, and more preferably 30% by mass or more but less than 70% by mass. The content of unsaturated fatty acids having 16 or more carbon atoms in all the constitutive fatty acids is preferably 25% by mass or more but less than 65% by mass, and more preferably 30% by mass or more but less than 65% by mass.

When the condition that, in all the constitutive fatty acids, the content of saturated fatty acids having 16 or more carbon atoms is 20% by mass or more but less than 75% by mass, and the content of unsaturated fatty acids having 16 or more carbon atoms is 25% by mass or more but less than 70% by mass is satisfied, the amount of formation of triacyl glycerols with three saturated fatty acids (triacyl glycerols wherein all the three fatty acids bonded to glycerol are saturated fatty acids) in the obtained fat-and-oil composition is restrained, and an oil-in-water emulsified product obtained becomes one having good melting mouthfeel with no wax feeling, and, furthermore, the oxidation stability of the resulting fat-and-oil composition becomes better, and the flavor of a resulting oil-in-water emulsified product becomes better.

As specific examples of fat-and-oil D, there can be mentioned palm oil, fractionated oils of palm oil obtained by subjecting palm oil to a fractionation treatment (natural fractionation, solvent fractionation, fractionation with a surfactant or the like). Fat-and-oil D can be used solely or as a mixture of two or more so long as the condition of the content of each of the above saturated fatty acids and unsaturated fatty acids is met. As fat-and-oil D, a fractionated oil of palm oil having an iodine value of 25 to 75 is preferred, a fractionated oil of palm oil having an iodine value of 55 to 71 (sometimes referred to as palmolein) and a fractionated oil of palm oil having an iodine value of 25 to 49 (sometimes referred to as palmstearin) are further preferred, and a fractionated oil of palm oil having an iodine value of 55 to 71 is still further preferred.

When fat-and-oil C obtained by subjecting palm oil or a fractionated oil of palm oil to transesterification reaction is used, the emulsification stability of the resulting oil-in-water emulsified product becomes better.

When fat-and-oil C obtained by subjecting a fractionated oil of palm oil having an iodine value of 55 to 71 to transesterification reaction is used, the emulsification stability and melting mouthfeel of the resulting oil-in-water emulsified product becomes better.

Fat-and-oil E, which is an optional ingredient compoundable in the fat-and-oil composition of the invention, is a middle-melting fractionated oil of palm oil (sometimes referred to as palmmid fraction (PMF)) or palm oil in which fractionated oil or palm oil, the solid fat content (hereinafter, sometimes referred to as SFC) at 10° C. is 50% or more but less than 100%, the solid fat content at 20° C. is 20% or more but less than 90%, and the solid fat content at 35° C. is less than 6%. The middle-melting fractionated oil of palm oil means a hard part obtained by subjecting palm oil to fractionation treatment (natural fractionation, solvent fractionation, surfactant fractionation, etc.) to obtain a soft part, and then subjecting the soft part to further fractionation treatment. The above middle-melting fractionated oil of palm oil and the above palm oil can be used in combination of two.

The solid content of fat-and-oil E is preferably 50% or more but less than 95% at 10° C., 20% or more but less than 85% at 20° C., and less than 5% at 35° C., and is more preferably 50% or more but less than 90% at 10° C., 20% or more but less than 80% at 20° C., and less than 4% at 35° C.

When fat-and-oil E is compounded in the fat-and-oil composition of the invention, fat-and-oil E contributes, in the oil-in-water emulsified product, particularly cream of the invention, to good shape-retaining properties and good melting mouthfeel of the whipped cream. Furthermore, the melting mouthfeel of the whipped cream is such accompanied by cool feeling.

The fat-and-oil composition of the invention can also contain milk fat. Milk fat makes, in the oil-in-water emulsified product, particularly cream, melting mouthfeel better, and, in addition, makes flavor better.

The fat-and-oil composition of the invention can contain a fat-and-oil other than fat-and-oil A, fat-and-oil B, optional fat-and-oil C, optional fat-and-oil E, and optional milk fat, so long as the effects of the invention is not spoiled.

The fat-and-oil composition of the invention, usually, does not contain ingredient(s) other than fats-and-oils, but, so long as the effects of the invention is not spoiled, can contain therein ingredient(s) other than fats-and-oils, such as, for example, an emulsifier and an antioxidant in a small amount, preferably in an amount of less than 5% by mass, more preferably in an amount of less than 3% by mass, and still more preferably in an amount of less than 1% by mass. As the emulsifier, there can, for example, be used the same one as an emulsifier used as an optional ingredient in the oil-in-water emulsified product of the invention as mentioned later. As the antioxidant, there can, for example, be mentioned tocopherols, ascorbic acid fatty acid esters, tea extracts, rutin, etc.

The transesterification reaction used to obtain transesterified oils in fat-and-oil A, fat-and-oil B and fat-and-oil C can be either of chemical transesterification reaction and enzymatic transesterification reaction.

The chemical transesterification reaction is a transesterification reaction which is carried out using a chemical catalyst such as sodium methylate, and is poor in positional specificity (also referred to as random transesterification).

The chemical transesterification reaction can be carried out according to a conventional method, for example, by sufficiently drying a raw material fat-and-oil, adding a catalyst in an amount of 0.1 to 1% by mass based on the raw material fat-and-oil, and, then, stirring the mixture at 80 to 120° C. under reduced pressure for 0.5 to 1 hour. After completion of the transesterification reaction, the catalyst is washed away by water washing, and the resulting transesterified oil can be subjected to decolorization and/or deodorization treatment(s) as carried out in usual purification steps of edible oils.

The enzymatic transesterification reaction is carried out using lipase as a catalyst.

As the lipase, there can be used lipase powder or an immobilized lipase obtained by immobilizing lipase powder on a carrier such as Celite or an ion exchange resin. The transesterification reaction by enzymatic transesterification can be transesterification reaction poor in positional specificity or transesterification reaction rich in 1,3-position positional specificity, depending on the kind of lipase.

As lipases capable of carrying out transesterification reaction poor in positional specificity, there can be mentioned lipase derived from a microorganism which belongs to the genus *Alcaligenes* (e.g., lipase QLM and lipase PL made by Meito Sangyo Co., Ltd., etc.), lipase derived from a microorganism which belongs to the genus *Candida* (e.g., lipase OF made by Meito Sangyo Co., Ltd., etc.), etc.

As lipases capable of carrying out transesterification reaction rich in 1,3-position positional specificity, there can be mentioned immobilized lipase derived from *Rhizomucor miehei* (e.g., Lipozyme TLIM and Lipozyme RMIM made by Novozymes, etc.), etc.

The enzymatic transesterification reaction can, for example, by adding lipase powder or an immobilized lipase in an amount of 0.02 to 10% by mass, preferably 0.04 to 5% by mass based on a raw material fat-and-oil, and, then, stirring the mixture at 40 to 80° C., preferably 40 to 70° C. for 0.5 to 48 hours, preferably 0.5 to 24 hours. After completion of the transesterification reaction, the lipase powder or immobilized lipase is removed by filtration or the like, and the resulting transesterified oil can be subjected to decolorization and/or deodorization treatment(s) as carried out in usual purification steps of edible oils.

The degree of progress of transesterification reaction in the transesterification reaction poor in positional specificity can, for example, be expressed by randomization proportion. The randomization proportion shows that the higher the value is, the poorer in positional specificity the transesterification reaction becomes, but, in the invention, the randomization proportion is used as an index to express the degree of progress of the transesterification reaction. The randomization proportion can be calculated from the fatty acid composition of all the constitutive fatty acids constituting the triacyl glycerols of a fat-and-oil (according to AOCS Celf-96) and the fatty acid compositions constituting the 2-position of the triacyl glycerols of the fat-and-oil before and after the transesterification reaction (according to AOCS Ch3-91). The randomization proportion can be calculated using, as an index, among fatty acid compositions, particularly palmitic acid which is a saturated fatty acid having 16 carbon atoms. Randomization proportion (%)=(the proportion of palmitic acid in all the constitutive fatty acids constituting the 2-position of the triacyl glycerols after the transesterification reaction−the proportion of palmitic acid in all the constitutive fatty acids constituting the 2-position of the triacyl glycerols before the transesterification reaction)/(the proportion of palmitic acid in all the constitutive fatty acids constituting the triacyl glycerols−the proportion of palmitic acid in all the constitutive fatty acids constituting the 2-position of the triacyl glycerols before the transesterification reaction)×100.

The randomization proportion in the transesterification reaction is preferably 30% or more, more preferably 60% or more, and still more preferably 90% or more, namely 90 to 100%.

The content of fat-and-oil A in all the fat-and-oil ingredients derived from vegetable fats-and-oils in the fat-and-oil composition of the invention needs to be more than 60% by mass but 98% by mass or less, and is preferably more than 60% by mass but 93% by mass or less, more preferably more than 60% by mass but 80% by mass or less and still more preferably more than 60% by mass but 75% by mass or less. When the content of fat-and-oil A is 60% by mass or less, shape-retaining properties, flower form making properties and dripping of water are insufficient, and when it is more than 98% by mass, emulsification stability cannot be obtained.

The content of fat-and-oil B in all the fat-and-oil ingredients derived from vegetable fats-and-oils in the fat-and-oil composition of the invention needs to be 1 to 25% by mass, and is preferably 3 to 20% by mass and more preferably 5 to 15% by mass. When the content of fat-and-oil B is less than 1% by mass, emulsification stability is insufficient, and when it is more than 25% by mass, melting mouthfeel becomes bad.

The content of fat-and-oil C and/or fat-and-oil E as optional ingredient(s) in all the fat-and-oil ingredients derived from vegetable fats-and-oils in the fat-and-oil composition of the invention is preferably 1 to 38% by mass, more preferably 10 to 30% by mass and still more preferably 20 to 25% by mass as the total of fat-and-oil C and fat-and-oil E. When the content of fat-and-oil C and/or fat-and-oil E is within the above range, melting mouthfeel and/or emulsification stability become(s) further excellent.

When the fat-and-oil composition of the invention contains milk fat, the content of milk fat in all the fat-and-oil ingredients is preferably 10 to 90% by mass, more preferably 10 to 70% by mass and still more preferably 10 to 50% by mass. In this case, the remaining fat-and-oil ingredients are fat-and-oil ingredients derived from vegetable fats-and-oils.

The solid fat content in all the fat-and-oil ingredients derived from vegetable fats-and-oils in the fat-and-oil composition of the invention is preferably 50 to 80% at 10° C., 35 to 70% at 15° C. and 0 to 8% at 30° C., more preferably 50 to 80% at 10° C., 40 to 70% at 15° C. and 1 to 8% at 30° C., and further more preferably 55 to 80% at 10° C., 42 to 68% at 15° C. and 1 to 6% at 30° C. When the solid fat content is within the above necessary range, melting mouthfeel of a oil-in-water emulsified product obtained becomes better.

A solid fat content can be measured, for example according to 2.2.9-2003 Solid Fat Content (NMR method) of "Kijun Yushi Bunseki Shikenho" (Standard Methods for the Analysis of Fats, Oils and Related Materials) edited by a corporate juridical person Japan Oil Chemists' Society.

The proportion of trans fatty acids in all the constitutive fatty acids of the fat-and-oil composition of the invention is preferably less than 5% by mass, more preferably less than 3% by mass, still more preferably less than 1% by mass and most preferably 0% by mass, in view of not containing trans fatty acids in a substantial amount.

The fat-and-oil composition of the invention can suitably be used as a fat-and-oil used for preparation of oil-in-water emulsified products, for example creams (particularly, whipping creams), coffee whiteners, ice creams, etc. The fat-and-oil composition of the invention can particularly suitably be used as a fat-and-oil used for preparation of creams (particularly, whipping creams).

The oil-in-water emulsified product of the invention is now described below.

The oil-in-water emulsified product of the invention is characterized in containing the fat-and-oil composition of the invention. The oil-in-water emulsified product of the invention can contain only fat-and-oil ingredients derived from the fat-and-oil composition of the invention, or can contain another fat-and-oil, as a fat-and-oil ingredient other than fat-and-oil ingredients derived from the fat-and-oil composition of the invention.

The oil-in-water emulsified product of the invention can contain milk fat, and in such a case, the oil-in-water emulsified product of the invention is one so-called compound cream.

When the oil-in-water emulsified product of the invention contain milk fat, the total content of fat-and-oil ingredients derived from vegetable fats-and-oils, in the all the fat-and-oil ingredients including the milk fat itself of the oil-in-water emulsified product, is preferably 10 to 90% by mass, more preferably 30 to 90% by mass, still more preferably 50 to 90% by mass, and the content of the milk fat is preferably 10 to 90% by mass, more preferably 10 to 70% by mass, still more preferably 10 to 50% by mass.

The oil-in-water emulsified product of the invention can contain another fat-and-oil, as a fat-and-oil ingredient other than fat-and-oil ingredients derived from the fat-and-oil composition of the invention. As another fat-and-oil, there can usually be used a fat-and-oil for oil-in-water emulsified products used as cream, particularly whipping cream.

The proportion of fat-and-oil ingredients derived from the fat-and-oil composition of the invention in all the fat-and-oil ingredients of the oil-in-water emulsified product of the invention is preferably 50 to 100% by mass, more preferably 70 to 100% by mass, still more preferably 80 to 100% by mass, and most preferably 90 to 100% by mass.

In the oil-in-water emulsified product of the invention, there can be compounded in an appropriate amount, as ingredients other than fat-and-oil ingredients as mentioned above, optionally compounded in the oil-in-water emulsified product of the invention, ingredients usually compounded in oil-in-water emulsified products such as, for example, an emulsifier, a milk solid no fat, a sugar, a stabilizer and a salt.

As the emulsifier, there can be mentioned so far known emulsifiers such as, for example, lecithin, glycerol fatty acid esters, sucrose fatty acid esters, propylene glycol fatty acid esters, sorbitan fatty acid esters, polyglycerol fatty acid esters and organic acid fatty acid esters.

As the milk solid no fat, there can, for example, be mentioned skim milk, skim milk powder, whey powder, sodium caseinate, etc. Part of the milk solid no fat can be replaced with a vegetable protein.

As the sugar, there can, for example, be mentioned glucose, maltose, sorbitol, sucrose, lactose, etc.

As the stabilizer, there can, for example, be mentioned xanthane gum, guar gum, etc.

As the salt, there can, for example, be mentioned sodium metaphosphate, alkali metal salts of phosphoric acid, alkali metal salts of citric acid, etc.

The oil-in-water emulsified product of the invention contains fat-and-oil ingredients, in a content of, preferably 20 to 50% by mass, more preferably 30 to 50% by mass, and still more preferably 40.5 to 50% by mass. Namely, in the oil-in-water emulsified product of the invention, it is possible to adjust the content of fat-and-oil ingredients to compounding of high fat-and-oil ingredients exceeding 40% by mass, and it is also possible to adjust it to compounding of low fat-and-oil ingredients.

The oil-in-water emulsified product of the invention has high emulsification stability, and is good in whipping characteristics such as melting mouthfeel, foaming properties and shape-retaining properties.

When the oil-in-water emulsified product of the invention contains milk fat, besides the above effects, the flavor of the oil-in-water emulsified product becomes better.

From the viewpoint that the oil-in-water emulsified product of the invention does not substantially contain trans fatty acids, the proportion of trans fatty acids in all the constitutive fatty acids of all the fat-and-oil ingredients contained in the oil-in-water emulsified product needs to be less than 5% by mass, and is preferably less than 3% by mass, more preferably less than 1% by mass, and most preferably 0% by mass.

The preparation process of the oil-in-water emulsified product of the invention is not particularly restricted, and so far known processes can be used. For example, it can be prepared by preparing an oil phase containing the fat-and-oil composition of the invention and an aqueous phase, respectively, mixing the oil phase with the aqueous phase, and subjecting the resulting emulsified product to homogenization treatment. Further, if necessary, it is also possible to make pasteurization treatment. The homogenization treatment can be either of pre-homogenization made before the pasteurization treatment and post-homogenization made after the pasteurization treatment, and double homogenization wherein both of the pre-homogenization and the post-homogenization are combined.

The oil-in-water emulsified product of the invention in a case wherein milk fat is contained (compound cream) can be prepared by emulsifying an oil phase containing the fat-and-oil composition of the invention in a case wherein milk fat is contained and an aqueous phase. The compound cream can also be prepared by compounding fresh cream (cream prepared from only milk fat) in an aqueous phase, and emulsifying the aqueous phase and an oil phase containing the fat-and-oil composition of the invention. Further, the compound cream can also be prepared by emulsifying an oil phase containing the fat-and-oil composition of the invention and an aqueous phase, and mixing the resulting emulsified product with fresh cream.

The oil-in-water emulsified product of the invention can be used as foods such as cream, coffee whitener and ice cream, and, particularly, can suitably be used as cream.

The cream of the invention can suitably be used as whipping cream (which includes either of cream for whipping before foaming and whipped cream after foaming), and the whipping cream can suitably be used in foods of confectionery and bread-making fields such as cakes and breads.

The compounding composition of the whipping cream of the invention is, for example, preferably 20 to 50% by mass of fat-and-oil ingredients, 3 to 6% by mass of a milk solid no fat, 0.4 to 1.0% by mass of an emulsifier, 43.0 to 76.55% by mass of water, 0.05 to 0.30% by mass of a salt, more preferably 30 to 50% by mass of fat-and-oil ingredients, 3 to 6% by mass of a milk solid no fat, 0.4 to 1.0% by mass of an emulsifier, 44.25 to 65.55% by mass of water, 0.05 to 0.20% by mass of a salt, and still more preferably 40.5 to 50% by mass of fat-and-oil ingredients, 4 to 5% by mass of a milk solid no fat, 0.4 to 0.6% by mass of an emulsifier, 44.25 to 55.05% by mass of water, 0.05 to 0.15% by mass of a salt.

There can, if necessary, be added to the whipping cream a sugar, a stabilizer, a perfume, etc.

The cream of the invention can also be used suitably as a cooking cream such as a cream sauce without foaming.

The cream of the invention can be used in mixing with another vegetable cream.

EXAMPLES

The invention is specifically described below according to examples and comparative examples, but the invention is not limited thereby at all.

(Preparation of a Transesterified Oil) (Fat-and-Oil

Palmolein (trade name: Palmolein, made by The Nisshin OilliO Group, Ltd., fatty acid composition: the content of saturated fatty acids having 16 or more carbon atoms 44.0% by mass, the content of unsaturated fatty acids having 16 or more carbon atoms 53.7% by mass, the content of fatty acids having 14 or less carbon atoms 1.2% by mass, iodine value: 56.4) was sufficiently dried with heating to 120° C. under reduced pressure, sodium methylate (positional specificity: poor in positional specificity) was added in an amount of 0.2% by mass of the dried palmolein, and the mixture was subjected to transesterification reaction at 110° C. for 0.5 hour under reduced pressure and stirring. After the completion of the reaction, the sodium methylate was removed with water washing, and the resulting mixture was subjected to decolorization and deodorization treatments according to usual purification methods to obtain an transesterified oil. The randomization proportion (palmitic acid base) of the transesterified oil was 100%.

(Preparation of a Fat-and-Oil Composition)

Raw material fats-and-oils were mixed in a compounding proportion shown in Tables 1 to 3 to obtain the fat-and-oil compositions of Examples 1 to 7, and the fat-and-oil compositions of Comparative examples 1 to 4.

As the raw material fats-and-oils shown in Tables 1 to 3, the following were used.

Extremely hardened oil of a coconut oil (fat-and-oil A)

(trade name: Yashiko 34, made by The Nisshin OilliO Group, Ltd., fatty acid composition: lauric acid content 46.7% by mass)

Coconut oil (fat-and-oil A)

(trade name: Purified Coconut Oil, made by The Nisshin OilliO Group, Ltd., fatty acid composition: lauric acid content 46.7% by mass)

Palm oil (fat-and-oil E)
 (trade name: Purified Palm Oil, made by The Nisshin OilliO Group, Ltd., SFC: 10° C. 53.8%, 20° C. 20.3%, 35° C. 5.4%,)
Middle-melting fractionated oil of palm oil (fat-and-oil E)
 (process product having an iodine value of 45 made by Malaysia ISF Co., SFC: 10° C. 75.3%, 20° C. 49.7%, 35° C. 0.0%, fatty acid composition: the content of saturated fatty acids having 16 or more carbon atoms 53.4% by mass, the content of unsaturated fatty acids having 16 or more carbon atoms 45.2% by mass, the content of fatty acids having 14 or less carbon atoms 1.2% by mass, iodine value: 45.4)
Rapeseed oil having a high oleic acid content (fat-and-oil B)
 (trade name: Healthy Light, made by The Nisshin OilliO Group, Ltd., clarity is maintained at 0° C. for 5 hours or more)

The fatty acid composition in the raw material fats-and-oils for fat-and-oil compositions was measured according to a gas chromatography (according to AOCS Celf-96).

(Measurement of SFC of a Fat-and-Oil Composition and Trans Fatty Acid Content in a Fat-and-Oil Composition)

SFC values at each temperature (5° C., 10° C., 15° C., 20° C., 25° C., 30° C., 35° C., 40° C.) of the fat-and-oil compositions of the examples and the comparative examples were measured according to 2.2.9-2003 Solid Fat Content (NMR method) of "Kijun Yushi Bunseki Shikenho" (Standard Methods for the Analysis of Fats, Oils and Related Materials) edited by a corporate juridical person Japan Oil Chemists' Society. From SFC values at 15° C. and 25° C., the difference between SFC at 15° C. and SFC at 25° C. was calculated.

The trans fatty acid contents in the fat-and-oil compositions of the examples and the comparative examples were measured according to a gas chromatography (according to AOCS Celf-96). These measurement results are shown together in Tables 1 to 3.

TABLE 1

Composition of fat-and-oil composition, trans fatty acid content, SFC, cream evaluation

| | | Fat-and-oil composition | | | |
|---|---|---|---|---|---|
| | | Example 1 | Example 2 | Example 3 | Example 4 |
| Composition of fat-and-oil composition (% by mass) | Extremely hardened oil of coconut oil | 90 | 30 | 60 | 70 |
| | Coconut oil | 0 | 37.5 | 15 | 0 |
| | Rapeseed oil containing oleic acid in a high content | 10 | 7.5 | 5 | 10 |
| | Palm oil | 0 | 0 | 0 | 0 |
| | Middle-melting fractionated oil of palm oil | 0 | 25 | 20 | 0 |
| | Transesterified oil | 0 | 0 | 0 | 20 |
| Trans fatty acid content in all the constitutive fatty acids in the fat-and-oil composition (% by mass) | | 0.1 | 0.2 | 0.2 | 0.1 |
| SFC of fat-and-oil composition (%) | 5° C. | 81.8 | 69.9 | 77.2 | 68.6 |
| | 10° C. | 77.2 | 57.8 | 66.1 | 61.6 |
| | 15° C. | 66.2 | 42.3 | 49.1 | 49.7 |
| | 20° C. | 48.4 | 18.8 | 28.6 | 32.0 |
| | 25° C. | 14.0 | 2.5 | 5.1 | 9.2 |
| | 30° C. | 5.3 | 1.4 | 2.5 | 4.3 |
| | 35° C. | 1.0 | 0.0 | 0.5 | 2.5 |
| | 40° C. | 0.0 | 0.0 | 0.0 | 0.3 |
| | Difference between 15° C. & 25° C. | 52.2 | 39.8 | 44.0 | 40.5 |

| | | Cream | | | |
|---|---|---|---|---|---|
| | | Example 8 | Example 9 | Example 10 | Example 11 |
| Content of fat-and-oil ingredients in cream (% by mass) | | 44.5 | 44.5 | 44.5 | 44.5 |
| Proportion of trans fatty acids in all the constitutive fatty acids in all the fat-and-oil ingredients of the cream (% by mass) | | 0.1 | 0.2 | 0.2 | 0.1 |
| Evaluation results of cream | Emulsification stability (second) | 300 | 360 | 240 | 480 |
| | Overrun (%) | 160 | 148 | 170 | 175 |
| | Shape-retaining properties | ◎ | ◎ | ◎ | ◎ |
| | Fineness and flower form making properties | ◎ | ◎ | ◎ | ◎ |
| | Dripping of water | ◎ | ◎ | ◎ | ◎ |
| | Melting mouthfeel | 5 | 5 | 5 | 5 |

TABLE 2

Composition of fat-and-oil composition, trans fatty acid content, SFC, cream evaluation

| | | Fat-and-oil composition | | |
|---|---|---|---|---|
| | | Example 5 | Example 6 | Example 7 |
| Composition of fat-and-oil composition (% by mass) | Extremely hardened oil of coconut oil | 30 | 70 | 80 |
| | Coconut oil | 37.5 | 0 | 0 |
| | Rapeseed oil containing oleic acid in a high content | 7.5 | 10 | 20 |
| | Palm oil | 0 | 20 | 0 |
| | Middle-melting fractionated oil of palm oil | 25 | 0 | 0 |
| | Transesterified oil | 0 | 0 | 0 |
| Trans fatty acid content in all the constitutive fatty acids in the fat-and-oil composition (% by mass) | | 0.2 | 0.2 | 0.2 |

TABLE 2-continued

Composition of fat-and-oil composition, trans fatty acid content, SFC, cream evaluation

| | | | | |
|---|---|---|---|---|
| SFC of fat-and-oil composition (%) | 5° C. | 69.9 | 69.3 | 67.4 |
| | 10° C. | 57.8 | 59.4 | 60.0 |
| | 15° C. | 42.3 | 45.1 | 49.6 |
| | 20° C. | 18.8 | 26.0 | 33.2 |
| | 25° C. | 2.5 | 7.0 | 6.9 |
| | 30° C. | 1.4 | 4.4 | 3.3 |
| | 35° C. | 0.0 | 2.7 | 0.9 |
| | 40° C. | 0.0 | 0.0 | 0.0 |
| | Difference between 15° C. & 25° C. | 39.8 | 38.1 | 42.7 |

| | | Cream | | |
|---|---|---|---|---|
| | | Example 12 | Example 13 | Example 14 |
| Content of fat-and-oil ingredients in cream (% by mass) | | 40.5 | 44.5 | 44.5 |
| Proportion of trans fatty acids in all the constitutive fatty acids in all the fat-and-oil ingredients of the cream (% by mass) | | 0.2 | 0.2 | 0.2 |
| Evaluation results of cream | Emulsification stability (second) | 1200 | 280 | 420 |
| | Overrun (%) | 197 | 160 | 154 |
| | Shape-retaining properties | ◎ | ◎ | ◎ |
| | Fineness and flower form making properties | ◎ | ◎ | ○ |
| | Dripping of water | ◎ | ◎ | ◎ |
| | Melting mouthfeel | 5 | 5 | 4 |

TABLE 3

Composition of fat and oil composition, trans fatty acid content, SFC, cream evaluation

| | | Fat and oil composition | | | |
|---|---|---|---|---|---|
| | | Com. ex. 1 | Com. ex. 2 | Com. ex. 3 | Com. ex. 4 |
| Composition of fat and oil composition (% by mass) | Extremely hardened oil of coconut oil | 100 | 70 | 40 | 70 |
| | Coconut oil | 0 | 0 | 0 | 0 |
| | Rapeseed oil containing oleic acid in a high content | 0 | 0 | 10 | 30 |
| | Palm oil | 0 | 0 | 0 | 0 |
| | Middle-melting fractionated oil of palm oil | 0 | 30 | 50 | 0 |
| | Transesterified oil | 0 | 0 | 0 | 0 |
| Trans fatty acid content in all the constitutive fatty acids in the fat and oil composition (% by mass) | | 0.0 | 0.2 | 0.4 | 0.3 |
| SFC of fat and oil composition (%) | 5° C. | 90.9 | 81.5 | 70.1 | 56.7 |
| | 10° C. | 85.8 | 69.7 | 59.3 | 49.2 |
| | 15° C. | 73.6 | 50.9 | 36.5 | 39.0 |
| | 20° C. | 53.8 | 29.1 | 12.4 | 23.8 |
| | 25° C. | 15.6 | 7.7 | 5.4 | 4.8 |
| | 30° C. | 5.9 | 4.3 | 2.8 | 2.4 |
| | 35° C. | 1.1 | 2.1 | 0.8 | 0.8 |
| | 40° C. | 0.0 | 0.2 | 0.0 | 0.0 |
| | Difference between 15° C. & 25° C. | 58.0 | 43.2 | 31.1 | 34.2 |

| | | Cream | | | |
|---|---|---|---|---|---|
| | | Com. ex. 5 | Com. ex. 6 | Com. ex. 7 | Com. ex. 8 |
| Content of fat and oil components in cream (% by mass) | | 44.5 | 44.5 | 44.5 | 44.5 |
| Proportion of trans fatty acids in all the constitutive fatty acids in all the fat and oil ingredients of the cream (% by mass) | | 0.0 | 0.2 | 0.4 | 0.3 |
| Evaluation results of cream | Emulsification stability (second) | 60 | 10 | 600 | 480 |
| | Overrun (%) | 173 | 75 | 157 | 164 |
| | Shape-retaining properties | ○ | X | X | ○ |
| | Texture, flower-making properties | Δ | X | X | ○ |
| | Separation of water | Δ | X | X | Δ |
| | Melting in the mouth | 5 | 1 | 3 | 3 |

(Preparation of Cream)

The Fat-and-Oil Compositions of Examples 1 to 7 and the Fat-and-Oil compositions of Comparative examples 1 to 4 were used as fats-and-oils of creams, and creams were prepared, in compounding shown in Table 4, according to the following process.

The soybean lecithin, the glycerol fatty acid ester, the sorbitan fatty acid ester, the sucrose fatty acid ester and the perfume were dissolved or dispersed in one of the above fats-and-oils to prepare an oil phase. Separately, the skim milk powder and the sodium metaphosphate were dissolved or dispersed in water to prepare an aqueous phase. Then, the prepared oil phase was added to the prepared aqueous phase, and the mixture was preliminarily emulsified by a homomixer while the temperature of the mixture was adjusted to 60 to 70° C. After the preliminarily emulsification, the mixture was homogenized under a pressure of 6.0 MPa, subjected to batch pasteurization at 85° C. for 15 minutes, cooled to about 10° C., and aged in a freezer of 5° C. for about 18 hours to obtain the creams of Examples 8 to 14 and Comparative examples 5 to 8.

TABLE 4

Composition of Cream (% by mass)

| | Cream | |
|---|---|---|
| | Examples 8-11, Example 13, Example 14, Com. exs. 5-8 | Example 12 |
| Fat-and-oil (fat-and-oil composition of examples and comparative examples) | 44.5 | 40.5 |
| Soybean lecithin | 0.25 | 0.25 |
| Glycerol fatty acid ester | 0.0625 | 0.0625 |
| Sorbitan fatty acid ester | 0.0625 | 0.0625 |
| Sucrose fatty acid ester | 0.125 | 0.125 |
| Perfume | 0.1 | 0.1 |
| Skim milk powder | 4.5 | 4.5 |
| Sodium metaphosphate | 0.1 | 0.1 |
| Water | 50.3 | 54.3 |
| Total | 100 | 100 |

Com. ex(s).: Comparative example(s) (the same in other tables)

Emulsification stability and whipping cream characteristics (overrun, shape-retaining properties, fineness and flower form making properties, dripping of water, melting mouthfeel) were evaluated according to the following evaluation methods using the creams of Examples 8 to 14 and Comparative examples 5 to 8. The results of the evaluation are shown in Tables 1 to 3.

<Emulsification Stability>

Each 60 g of the creams was weighed out in beakers, respectively, the temperature of the cream was adjusted to 20° C., a propeller of four blades was rotated at 160 rpm by a Three-One Motor, and time needed till the cream is coagulated and its viscosity is increased (so-called plasticization) was measured. It is meant that the longer the time needed till the cream is coagulated and its viscosity is increased is, the higher its emulsification stability is. The time needed till the cream is coagulated and its viscosity is increased is, usually, preferably 120 seconds or more.

<Whipping Cream Characteristics>

The creams of Examples 8 to 14 and the creams of Comparative examples 5 to 8 were used, and their whipping cream characteristics were evaluated.

35 g of sugar was added to 500 g of each of the creams and the mixture was whipped at the intermediate speed 2 in a HOBART Mixer (made by HOBART JAPAN). As to the resulting whipped cream, overrun, shape-retaining properties, fineness and flower form making properties, dripping of water and melting mouthfeel were evaluated.

(Overrun)

As to each of the creams, the proportion of the increased volume of the cream (overrun (%)) was calculated. It is meant that the larger the value of overrun is, the better foaming properties are. Overrun is, usually, preferably 80 to 220%.

Overrun (%)=[(mass of a cream of a definite volume before the whipping−mass of a cream of a definite volume after the whipping)/(mass of a cream of a definite volume after the whipping)]×100

(Shape-Retaining Properties)

Each of the whipped creams was put in a squeezing pouch and squeezed out into a flower form, and preserved at 20° C. for 3 hours. The appearance of the whipped cream after the preservation was evaluated according to the following four-stage criterion.

◎: There is no lost shape and shape-retaining properties are very good.
○: There is almost no lost shape and shape-retaining properties are good.
Δ: Such a state that there is a little lost shape
X: Such a state that there is large lost shape (Fineness and Flower Form Making Properties)

Each of the whipped creams was put in a squeezing pouch and squeezed out into a flower form, and the appearance of the whipped cream at that time was evaluated according to the following four-stage criterion.

◎: Such a very good state that the surface is smooth and has gloss and the edge is sharp
○: Good
Δ: Such a state that roughness is observed on the surface and the edge is somewhat flat
x: Such a state that there is roughness and the whipped cream becomes soft as a whole (Dripping of Water)

Each of the whipped creams was preserved at 5° C. for 24 hours, and dripping of water from the whipped cream was evaluated according to the following criterion.

◎: There is no dripping of water.
○: There is almost no dripping of water.
Δ: There is some dripping of water.
x: There is much dripping of water.

(Melting Mouthfeel)

Each of the whipped creams was eaten by a panel of 10 specialized members, the preference of melting mouthfeel at the eating was graded according to five-stage criterion of 1 to 5, and the melting mouthfeel of the whipped creams was evaluated from the average mark of the 10 members. It is meant that the higher the average mark is, the better the melting mouthfeel is, and the lower the average mark is, the worse the melting mouthfeel is.

As understood from Tables 1 and 2, the creams of Examples 8 to 14 have high emulsification stability and were excellent although they are creams having such a high fat-and-oil content that the content of the fat-and-oil ingredients exceeds 40% by mass.

Furthermore, the creams of Examples 8 to 14 were excellent in foaming properties, and were satisfactory enough in shape-retaining properties, fineness and flower form making properties, dripping of water and melting mouthfeel.

On the other hand, as understood from Table 3, the cream of Comparative example 5 wherein only a lauric fat-and-oil was used as a raw material fat-and-oil was unsatisfactory in emulsification stability, fineness and flower form making properties, and dripping of water.

Furthermore, the cream of Comparative example 6 obtained by using the fat-and-oil composition of Comparative example 2 wherein no liquid oil was compounded was unsatisfactory in all the evaluation items.

Furthermore, the cream of Comparative example 7 obtained by using the fat-and-oil composition of Comparative example 3 wherein the content of the lauric fat-and-oil was less than the lower limit was unsatisfactory in shape-retaining properties, fineness and flower form making properties, dripping of water, and melting mouthfeel.

Furthermore, the cream of Comparative example 8 obtained by using the fat-and-oil composition of Comparative example 4 wherein the content of the liquid oil was more than the upper limit was unsatisfactory in dripping of water and melting mouthfeel.

(Preparation and Evaluation of a Compound Cream)

The compound cream of Example 15 was obtained by mixing the cream of Example 12 and fresh cream (fat content 40.5% by mass) at a mass ratio of 5:5 (the content of trans fatty acids in all the fat-and-oil ingredients of the compound cream of Example 15: 2.4% by mass). The total content of fat-and-oil ingredients derived from vegetable fats-and-oils in all the fat-and-oil ingredients contained in the compound cream of Example 15 was 50.0% by mass, and the content of milk fat in all the fat-and-oil ingredients was 50.0% by mass. Emulsification stability and whipping cream characteristics were evaluated using the compound cream of Example 15. The results are shown in Table 5.

TABLE 5

| Evaluation of compound cream | |
|---|---|
| Compound cream | Example 15 |
| Used cream | Example 12 |
| Emulsification stability (second) | 1200 or more |
| Overrun (%) | 176 |
| Shape-retaining properties | ◎ |
| Fineness and flower form making properties | ◎ |
| Dripping of water | ◎ |
| Melting mouthfeel | 5 |

As understood from Table 5, the compound cream of Example 15 has high emulsification stability and was excellent.

Furthermore, the compound cream of Example 15 was excellent in foaming properties, and the whipped cream after whipping was also satisfactory enough in shape-retaining properties, fineness and flower form making properties, dripping of water and melting mouthfeel.

The invention claimed is:

1. A fat-and-oil composition comprising a fat-and-oil A and a fat-and-oil B both of which are derived from vegetable fats-and-oils and further comprising a fat-and-oil C and/or a fat-and-oil E both of which are derived from vegetable fats-and-oils, wherein:

fat-and-oil A is at least one fat-and-oil selected from the group consisting of lauric fats-and-oils, fractionated oils of lauric fats-and-oils, extremely hardened oils of lauric fats-and-oils and transesterified oils obtained by subjecting lauric fats-and-oils to transesterification reaction, fat-and-oil B is a liquid oil, fat-and-oil C is a transesterified oil obtained by subjecting a fat-and-oil D which is derived from vegetable fats-and-oils and defined below, to a transesterification reaction, fat-and-oil D is a fat-and-oil wherein the content of saturated fatty acids having 16 or more carbon atoms in all the constitutive fatty acids being 20% by mass to less than 75% by mass, and the content of unsaturated fatty acids having 16 or more carbon atoms in all the constitutive fatty acids is 25% by mass to less than 70% by mass, and fat-and-oil E is a middle-melting fractionated oil of palm oil and/or palm oil in which fractionated oil and/or palm oil, the solid fat content at 10° C. is 50% to less than 100%, the solid fat content at 20° C. is 20% to less than 90%, and the solid fat content at 35° C. is less than 6%, and provided that (a) the content of fat-and-oil A in all the fat-and-oil ingredients derived from vegetable fats-and-oils being more than 60% by mass but 98% by mass or less, (b) the content of fat-and-oil B in all the fats-and-oils ingredients derived from vegetable fats-and-oils being 1 to 25% by mass, and (c) the total content of fat-and-oil C and fat-and-oil E in all the fats-and-oils ingredients derived from vegetable fats-and-oils being 1 to 38% by mass.

2. The fat-and-oil composition according to claim 1 wherein fat-and-oil D is a fractionated oil of palm oil having an iodine value of 55 to 71.

3. The fat-and-oil composition according to claim 1 which contains milk fat and wherein the content of the milk fat in all the fat-and-oil ingredients in the fat-and-oil composition is 10 to 90% by mass.

4. The fat-and-oil composition according to claim 1 which is used for preparation of cream.

5. An oil-in-water emulsified product which contains the fat-and-oil composition according to claim 1 and wherein the proportion of trans fatty acids in all the constitutive fatty acids in all the fat-and-oil ingredients in the oil-in-water emulsified product is less than 5% by mass.

6. The oil-in-water emulsified product according to claim 5 which contains milk fat and wherein the content of the milk fat in all the fat-and-oil ingredients in the oil-in-water emulsified product is 10 to 90% by mass.

7. The oil-in-water emulsified product according to claim 5 wherein the content of all the fat-and-oil ingredients in the oil-in-water emulsified product is more than 40% by mass.

8. The oil-in-water emulsified product according to claim 5 wherein the oil-in-water emulsified product is cream.

9. The oil-in-water emulsified product according to claim 8 wherein the cream is whipping cream.

10. A food using the oil-in-water emulsified product according to claim 5.

* * * * *